US007082743B1

(12) United States Patent  
Erickson et al.

(10) Patent No.: US 7,082,743 B1
(45) Date of Patent: Aug. 1, 2006

(54) LAND CLEARING APPARATUS

(76) Inventors: Robert W. Erickson, 813 Golden Oak, Georgetown, TX (US) 78628; Joseph W. Finnigan, III, 37 Guthrie Rd., Boerne, TX (US) 78006

( * ) Notice: Subject to any disclaimer, the term of this patent is extended or adjusted under 35 U.S.C. 154(b) by 0 days.

(21) Appl. No.: 11/067,439

(22) Filed: Feb. 25, 2005

(51) Int. Cl.
*A01D 34/53* (2006.01)
(52) U.S. Cl. ....................................................... 56/249
(58) Field of Classification Search ................. 89/1.13; 172/122, 123, 811; 144/24.12, 337, 356; 37/301–303; 56/249, 294, 504, 252, 156, 56/DIG. 12
See application file for complete search history.

(56) References Cited

U.S. PATENT DOCUMENTS

| | | | | | |
|---|---|---|---|---|---|
| 5,060,732 | A | * | 10/1991 | Baskett | 171/63 |
| 5,442,990 | A | * | 8/1995 | Krohn | 89/1.13 |
| 5,472,147 | A | * | 12/1995 | Doppstadt | 241/88.4 |
| 5,495,987 | A | * | 3/1996 | Slaby | 241/27 |
| 5,794,866 | A | * | 8/1998 | Shinn | 241/101.72 |
| 5,845,689 | A | * | 12/1998 | Egging et al. | 144/334 |
| 6,116,699 | A | * | 9/2000 | Kaczmarski et al. | 299/39.5 |
| 6,393,959 | B1 | * | 5/2002 | Amemiya | 89/1.13 |
| 6,871,485 | B1 | * | 3/2005 | Schafer | 56/249 |
| 2004/0244350 | A1 | * | 12/2004 | Schafer | 56/249 |

\* cited by examiner

*Primary Examiner*—Árpád Fábián Kovács
(74) *Attorney, Agent, or Firm*—James Ray & Assoc.

(57) ABSTRACT

An apparatus for cutting and clearing brush, trees and land debris includes a housing adapted for mounting to a carrier and a rotor assembly with a predetermined plurality of cutting tools mounted for rotation within the housing and driven by a gearbox and a motor combination. A tubular frame mounted to the housing above the rotor guides pushes the material for contact with the cutting tools mounted on the rotor. A movable front flange provides directional control for processed material discharge. A plurality of cutting tools are attached to a bottom portion of the housing for decreasing the size of the processed material. A plurality of a plate like members are attached to the bottom portion of the housing for limiting a size of the unprocessed material and for guiding the material into the housing for contact with stationary and rotating cutting tools. At least one deflector within the housing reduces the speed of the processed material for increased contact with the cutting tools.

19 Claims, 2 Drawing Sheets

LAND CLEARING APPARATUS

FIELD OF THE INVENTION

The present invention relates, in general, to an apparatus for clearing undesirable debris, brush and trees from undeveloped land and, more particularly, this invention relates to a land clearing apparatus which has incorporated therein a rotating rotor with protruding teeth for converting such debris, brush and trees into a shredded material.

BACKGROUND OF THE INVENTION

As is well known, a variety of land clearing apparatuses, predominantly in the form of attachment to rubber tired or track mounted carriers, have been utilized for clearing debris, brush and trees from undeveloped land. Generally, it is preferred to utilize land clearing apparatuses which have a horizontally disposed shaft, or rotor, as they are capable of cutting closer to the ground, provide for an improved visual operator control and are considered safer as they dispose of the remnants in the forward direction only.

Prior art land clearing machines have been generally equipped with swinging hammer type blade cutters that, although being sufficient to producing a fine shred remnant, will not tolerate impact with rocks and therefore are not suitable for cutting below the ground level, increase maintenance costs associated with replacement of the dull blade cutters and defective shafts these blade cutters swing on and increase maintenance costs associated with repair and rebalancing of the fatigued and cracked rotors these blade cutters are mounted to.

Furthermore, in some applications it is desirable to direct the shredded remnants toward the ground to further enhance the safety conditions of the personnel as well as eliminate reintroduction of such shredded remnants back into the cutting area.

SUMMARY OF THE INVENTION

The present invention provides an apparatus for cutting and clearing a material consisting of brush, trees and land debris above or below a ground level. The apparatus includes a housing assembly formed by a housing shroud having a predetermined length and a pair of first end members rigidly attached to each end of the housing shroud providing for a housing which is generally open in a first direction aligned with a working direction of the apparatus and in a second direction aligned toward the ground level. The housing is pivotally attachable to a rubber tired or track mounted carrier. A rotor assembly is positioned for rotatable movement within the housing and includes a hollow cylinder with an inner and outer surfaces. A pair of second end members rigidly attached to the inner surface and at least partially closing each end of the hollow cylinder. A rotational means is rigidly attached to each second end member and aligned with a longitudinal axis of the hollow cylinder. A predetermined plurality of tool support blocks is rigidly attached in a predetermined pattern to an outer surface of the hollow cylinder. Each of the predetermined plurality of support blocks has a cavity with a longitudinal axis aligned in a predetermined orientation about the longitudinal axis of the hollow cylinder. Each cavity is adapted for securing a mounting shank of a cutting tool which has a working end outwardly extending from the outer surface of the hollow cylinder in the predetermined orientation. The working end is disposed at a first predetermined height above the outer surface of the hollow cylinder. The predetermined orientation of the cutting tools maintains movement of the material transversely to the longitudinal axis of the hollow cylinder. A drive assembly of the presently preferred embodiment includes an in-line gearbox and a hydraulic motor coupled to a first rotational means of the rotor assembly and rigidly attached to a corresponding end member of the housing assembly and a bearing coupled to a second rotational member of the rotor assembly and rigidly attached to a second corresponding end member of the housing assembly. The motor is remotely operable to drive the rotor assembly. Alternatively, any well known indirect drive means may be employed to rotate the rotor assembly. A first and a second skid plate are removably attached to a bottom edge of each end member of the housing assembly and have a predetermined thickness for controlling the height of the working end of the cutting tools with regards to ground level. The apparatus is designed to clear debris below the ground level when the skid plates are removed. A tubular frame is rigidly attached to the outer surface of the housing shroud for holding a portion of the material disposed above the rotor assembly and for pushing the material to contact a first portion of the predetermined plurality of cutting tools which are generally aligned in the working direction. A predetermined plurality of plate like members are rigidly attached to an inner surface of the housing shroud adjacent the ground level for guiding the material to contact a second portion of the predetermined plurality of rigidly cutting tools generally aligned toward the inner surface of the housing shroud and for controlling a length of an unprocessed material. A predetermined plurality of second tool support blocks are rigidly attached to the inner surface of the housing shroud adjacent the ground level and form a pair of parallel rows which are aligned with a bottom edge of the housing shroud. A plurality of second cutting tools are secured within each respective one of the second tool support blocks. The second cutting tool may be identical to the cutting tool mounted on the rotor assembly. A movable flange is pivotally attached to a front edge of the housing shroud and movable between a first position in general alignment with an upper surface of the housing shroud for discharging the processed material in a direction generally toward the ground level and a second position wherein a front edge of the flange is lifted for discharging the processed material in a forward direction. The movable flange is remotely operable with a cylinder attached to a portion of such movable flange at one end and attached to the housing assembly at a distal end. At least one deflector is rigidly attached to an inner surface of the housing shroud and extends the length thereof for reducing the speed of the material being processed within the housing shroud to increase contact between such material and the cutting tools secured to the rotor assembly. A plate like member is removably attached to the bottom edge of the housing shroud for preventing rearward discharge of the material being grabbed by the cutting tools of the rotor assembly.

OBJECTS OF THE INVENTION

It is, therefore, one of the primary objects of the present invention to provide a land clearing apparatus.

Another object of the present invention is to provide a land clearing apparatus which can be used for clearing and cutting material below ground level.

Still another object of the present invention is to provide a land clearing apparatus which reduces maintenance costs for replacing cutting tool elements.

A further object of the present invention is to provide a land clearing apparatus which can be easily and inexpensively retrofitted into existing equipment.

Yet a further object of the present invention is to provide a land clearing apparatus which produces finely shredded remnants.

An additional object of the present invention is to provide a land clearing apparatus which will direct the processed and unprocessed remnants toward ground level.

In addition to the several objects and advantages of the present invention which have been described with some degree of specificity above, various other objects and advantages of the invention will become more readily apparent to those persons who are skilled in the relevant art from the following more detailed description of the invention, particularly, when such description is taken in conjunction with the attached drawing Figures and with the appended claims.

BRIEF DESCRIPTION OF THE VARIOUS EMBODIMENTS OF THE PRESENT INVENTION

Figure 1:
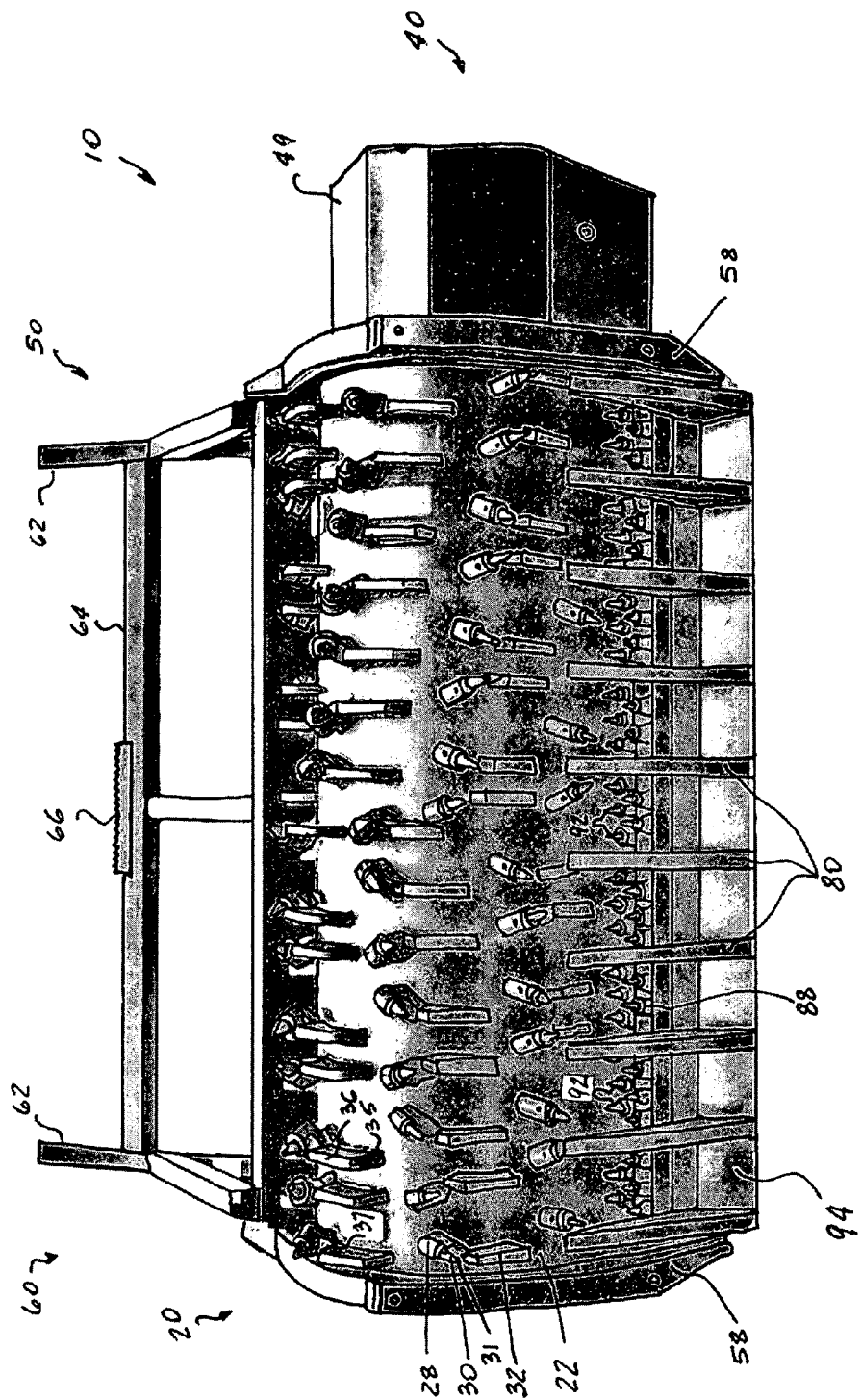
FIG. 1 is a partially rotated perspective front view of a land clearing apparatus of the present invention.

Prior to proceeding to the more detailed description of the present invention, it should be noted that, for the sake of clarity and understanding, identical components which have identical functions have been identified with identical reference numerals throughout the several views illustrated in the drawing figures.

Figure 2:
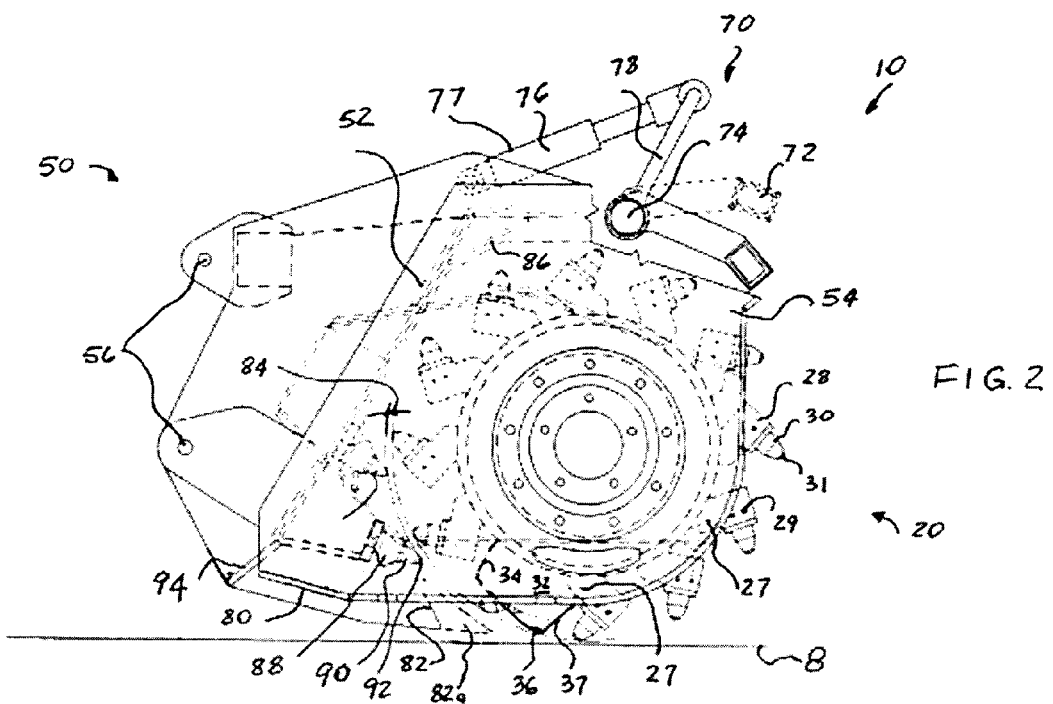
FIG. 2 is a side elevation of a land clearing apparatus of FIG. 1, particularly showing a rotating drum and a movable front flange.
Figure 3:
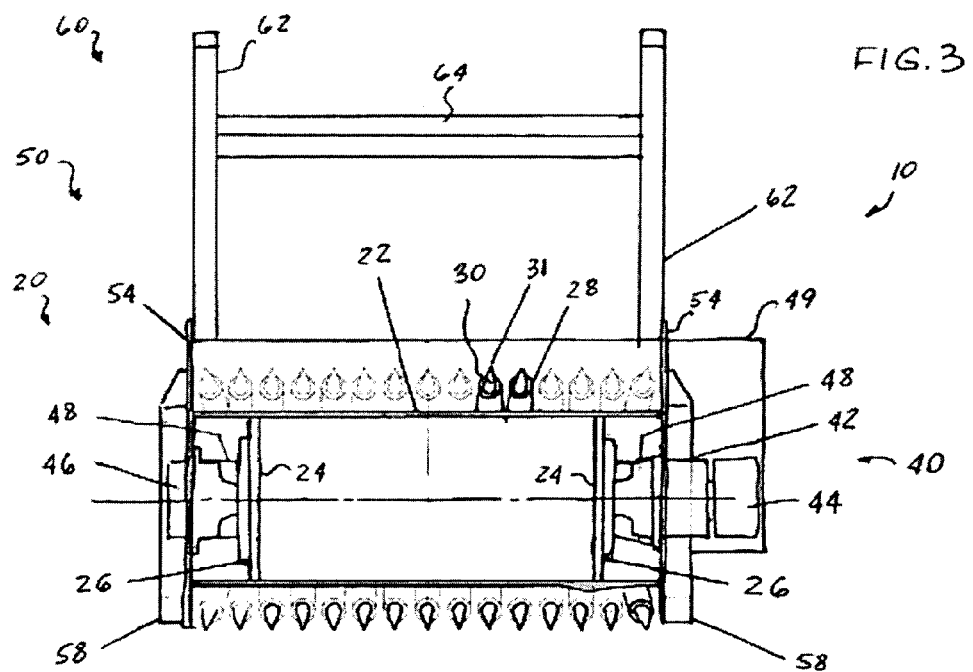
FIG. 3 is a schematic front elevation of the land clearing apparatus, particularly showing a drive system of the presently preferred embodiment.

Reference is now made to FIGS. 1–3. Illustrated therein is an apparatus, generally designated 10, for clearing debris, brush and trees from undeveloped land. The apparatus 10 includes a rotor assembly, generally designated 20, having a hollow cylindrical rotor 22 with a predetermined plurality of tool support blocks 28 rigidly attached in a predetermined pattern and in a predetermined orientation to an outer surface thereof. Preferably, such tool support blocks 28 are welded. A plurality of cutting tools 30 are removably secured within the cavity (not shown) of each tool support block 28 for impacting the material to be cleared and for preferably processing such material into shredded remnants.

The cutting tool 30 may be of any well known cutting tool type having a pointed working end 31 and which have a shank (not shown) either rotatably or stationaryly secured within the cavity (not shown) of the tool support block 28.

Preferably, the tool support blocks 28 and the cutting tools 30 are of a type taught by a closely related utility patent application Ser. No. 10/733,607 filed in the United States Patent Office on Dec. 11, 2003. The teachings of the utility patent application Ser. No. 10/733,607 are incorporated into this document by reference thereto. Such utility patent application teaches a cutting tool 30 with a cylindrical shank (not shown) which is secured for rotatable movement within the tool support block 28 with at least one retaining spiral pin 29 disposed at a predetermined angle to the outer surface of the rotor 22. Such at least one spiral pin 29 expedites removal and replacement of the cutting tool 30 thus decreasing the maintenance costs.

Those skilled in the art will readily understand that rotation of the cutting tool 30 during operation will evenly wear out its carbide tip working end 31 extending the life of such cutting tool 30 and, more particularly, extending the replacement cycle thereof. Such extended replacement cycle further decreases maintenance costs associated with cutting tool replacement.

Preferably, such predetermined orientation of the working end 31 maintains the movement of the cutting material transversely to a longitudinal axis of the rotor assembly 20 and prevents such material from shifting to one side of the rotor 22 during operation. Preferably, the longitudinal axis of the rotor assembly 20 is horizontally disposed.

It is further presently preferred that a longitudinal axis of each cutting tool 30 will be disposed at a predetermined angle with respect to the ground level 8 as best shown in FIG. 2 for improving operation of the apparatus 10.

For controlling a penetration depth of the working end 31 into material to be cleared, the apparatus 10 may be adapted with means 32 disposed adjacent each cutting tool 30 and having at least a portion disposed at a predetermined height above the outer surface of the rotor 22. Preferably, such means is a plurality of plate like members 32 rigidly attached to the outer surface of the rotor 22, preferably by welding, with each plate like member 32 associated with the cutting tool 30. Each plate like member 32 is transversely disposed to the longitudinal axis of the rotor 22 and has at least one first edge 34 extending transversely to the longitudinal axis of the rotor 22. A second edge 36 is disposed at the predetermined height above the outer surface of the rotor 22 for contacting the material to be processed and for controlling the penetration depth of the carbide tip working end 31. Preferably, such second edge 36 is provided with a predetermined curvature. Alternatively, such means 32 may be formed from tubular or wire materials.

It has been determined that for cutting very soft wood, such as cedar, the predetermined height of the second edge 36 must be lower than the predetermined height of the carbide tip working end 31 and such difference in height must be less than one inch.

In further reference to FIG. 2, the plate like member 32 is provided with a third edge 37 overlapping a base portion 29 of the support block 28 adjacent the outer surface of the rotor 22 and being rigidly attached to such base portion 27 by welding to increase strength of the attachment of the tool support block 28 to the rotor 22. It will be appreciated that as the working end 31 impacts the material to be cleared, the third edge 37 will resist the spring back of the support block 28 in the direction opposite the rotational direction of the rotor 22. Advantageously, it has been determined that such attachment of the third edge 37 to the base portion 27 enables a reduced thickness of the rotor 22 thus reducing overall weight of the apparatus 10.

In particular reference to FIG. 3, the rotor 22 has a pair of end members 24 at least partially closing each end of the rotor 22. Each end member 24 is provided with an outwardly extending pivot 26 disposed in alignment with the longitudinal axis of the rotor 22. Preferably, each end member 24 is disposed within the rotor 22 at a predetermined distance from each end thereof.

Alternatively, a single shaft member (not shown) incorporating pivots 26 at each end may be extended through the rotor 22 and attached to end members 24 for enabling rotation of such rotor 22.

The rotation of rotor 22 is enabled by a drive means, generally designated 40, which preferably includes an in-line planetary gearbox 42 coupled to one pivot 26 at one end and to a prime mover at a distal end. Preferably, such prime mover is a hydraulic motor 44. The second pivot 26 is coupled to a bearing means 46. A pair of cover means 48 encasing each pivot 26 and secured to each end member 24 and to respective planetary in-line gearbox 42 and bearing means 46 may be provided for containing a predetermined amount of lubricant thus eliminating the need for periodic lubrication. Alternatively, such bearing means 46 and planetary gearbox 42 may be adapted with sealed self-lubricating bearings (not shown). A second cover means 49 may be provided for enclosing and protecting the in-line planetary gearbox 42 and the prime mover 44. The drive means 40 are remotely operable.

Advantageously, such drive means 40 provides for direct attachment of the in-line planetary gearbox 42 and the prime mover 44 and for direct drive of the rotor 22. Alternatively, an indirect drive means of any well known type including but not limited to chain, belt, gear, or cable may be utilized for rotating the rotor 22.

For attachment to a rubber tired or track mounted carrier (not shown), the rotor 22 is rotatably disposed within a housing assembly, generally designated 50. The housing assembly 50 has a housing shroud 52 of a predetermined shape which is preferably open at the front and bottom. A pair of end plates 54 are rigidly attached to each end of the housing shroud 52 and are adapted for attachment of the drive means 40 to rotatably support the rotor assembly 20. A means 56 attached to the outer surface of the housing shroud 52 are provided for pivotal attachment of the apparatus 10 to the rubber tired or track mounted carrier (not shown).

The bottom edges of the end plates 54 are provided with removable skid members 58 of a predetermined thickness for controlling the cutting height of the apparatus 10. Advantageously, the apparatus 10 when operable without the skid members 58 enables the working end 31 of the cutting tool 30 to be disposed below the ground level 8 enabling the apparatus 10 to cut through hard material such as rock and asphalt.

Attached to the upper surface of the housing 52 is a means, generally designated 60, for guiding material to be processed in a direction toward the rotor 22. Such guiding means 60 includes a pair of side frames 62 extending in a forward direction for holding the brush and trees in a cutting path of the cutting tools 30 and a generally horizontal member 64 attached to each side frame 62 for bending trees or tall brush forward. Preferably, the side frames 62 and the horizontal member 64 are of a tubular construction. The generally horizontal member 64 may be adapted with serrations 66 at least partially covering the length thereof for positively retaining larger trees during cutting.

To selectively direct the processed remnants either toward the ground level 8 or in a forward direction, the apparatus 10 may be adapted with a first directional means, generally designated 70, and shown in FIG. 2. Such first directional means 70 includes a movable flange 72 which is pivotally attached to either the housing shroud 52 or the end plates 54 with a pair of pivots 74. The flange 72 may be selectively pivoted between a first position in general alignment with the upper surface of the housing shroud 52 for discharging processed material in a direction generally toward the ground level 8 and a second position wherein the front edge of such movable flange 72 is lifted for discharging processed material in a forward direction. Such movable flange 72 may be pivoted manually, but preferably, it is equipped with a powered actuator 76 having a communication means 77 connected to a carrier control system (not shown) for remote operation of such first directional means 70.

To limit a length of the rearwardly discharged remnants and to guide the material into confines of the housing shroud 52, at least one means 80, preferably a plate like member, is rigidly attached to the bottom portion of the housing shroud 52. Preferably, such at least one plate like member 80 is a predetermined plurality of plate like members 80, each having a predetermined thickness and at least one edge 82 extending from the housing shroud 52 toward the rotor 22, as best shown in FIG. 2. Preferably, such at least one edge 82 is straight and is aligned at a predetermined angle toward the ground level 8. Alternatively, such at least one edge 82 may be adapted with a curvature indicated by 82a generally following an outer arc of the cutting tools 30 for closing the gap therewith adjacent the ground level 8.

The housing assembly 50 may be further provided with a second directional means 94 for directing discharge of the unprocessed material toward the ground level 8 and for preventing discharge of such unprocessed material in a rearward direction. Preferably, such second directional means 94 is a member 94 removably attached to the lower edge of the housing shroud 52 and extending the length of the rotor 22. Preferably, the material of such member 94 is metal.

To control the size of the processed remnants, the apparatus 10 is adapted with at least one row, and preferably two rows, of a predetermined plurality of second tool support blocks 88 stationaryly attached to the rear portion of the housing shroud 52 and disposed to form a predetermined gap 84 between the working end 31 of the cutting tools 30 mounted on the rotor 22 and a working end 92 of cutting tools 90 secured within the second tool blocks 88, as best shown in FIG. 2. Such predetermined plurality of the second cutting tools 90 mounted to the housing shroud 52 increases ripping action during operation resulting in finer shredded remnants.

Such second cutting tool 90 may be identical to the cutting tool 30 mounted on the outer surface of the rotor 22, but preferably, the second cutting tool 90 is of a smaller size and similar construction as the cutting tool 30.

At least one deflector means 86 may be attached to the inner surface of the housing shroud 52 for reducing the speed of the processed material within the housing shroud 52 and for enabling a greater number of cutting tools 30 mounted on the rotor 22 to contact such material thus producing finer shredded remnants.

It will be appreciated that a combination of the at least one deflector 86 and at least one row of cutting tools 90 mounted on the inner surface of the housing shroud 52 will reduce the quantity of the unprocessed material and further result in a finer size of the shredded remnants.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit of the invention and scope of the appended claims.

We claim:

1. An apparatus for cutting and clearing brush, trees and land debris disposed at least one of at and below ground level, said apparatus comprising:
    (a) a hollow cylinder;
    (b) a pair of end members rigidly attached to said hollow cylinder and at least partially closing each end thereof;
    (c) means rigidly attached to each of said end members and aligned with a longitudinal axis of said hollow cylinder for enabling rotation thereof;

(d) a predetermined plurality of tool support blocks rigidly attached in a predetermined pattern to an outer surface of said hollow cylinder, each of said predetermined plurality of said support blocks has a tool attachment means disposed therein with a longitudinal axis aligned in a predetermined direction about said longitudinal axis of said hollow cylinder;

(e) a predetermined plurality of cutting tools each having a working end and a mounting shank, said mounting shank is secured in said tool attachment means of said support block and said working end outwardly extending from said outer surface of said hollow cylinder in said predetermined direction, said working end disposed at a first predetermined height above said outer surface of said hollow cylinder; and (f) means engageable with said outer surface of said hollow cylinder adjacent each of said plurality of said cutting tools for controlling penetration of said working end into such material, said means having at least a portion disposed at a second predetermined height above said outer surface of said hollow cylinder which is smaller than said first predetermined height of said working end, wherein the difference between said first predetermined height and said second predetermined height is less than one inch.

2. The apparatus, according to claim 1, wherein said apparatus further includes means coupled to said rotational means for rotating said hollow cylinder about said longitudinal axis thereof.

3. The apparatus, according to claim 2, wherein said means for rotating said hollow cylinder includes an in-line gearbox directly coupled to a first portion of said rotational means at one end and to a prime mover at a distal end and a stationaryly disposed bearing means coupled to a second portion of said rotational means, whereby energization of said prime mover enables said gearbox to generate a rotating force and rotate said hollow cylinder in a working direction.

4. The apparatus, according to claim 1, wherein said apparatus further includes a housing means at least partially encasing said hollow cylinder and supporting thereof for rotation.

5. The apparatus, according to claim 4, wherein said housing means includes a housing shroud extending a predetermined length of said hollow cylinder and a pair of end members rigidly attached to said housing shroud, whereby said housing means are open in a first direction aligned with said working direction and in a second direction aligned toward such ground level.

6. The apparatus, according to claim 1, wherein said apparatus further includes a housing means and means rigidly attached to an outer surface of said housing means for holding a portion of such material disposed above said hollow cylinder and for pushing such material to contact a first portion of said predetermined plurality of said cutting tools generally aligned in said working direction.

7. The apparatus, according to claim 1, wherein said apparatus further includes a housing means and means rigidly attached to an inner surface of said housing means adjacent such ground level for guiding such material to contact a second portion of said predetermined plurality of said cutting tools generally aligned toward said inner surface of said housing means and for controlling a length of an unprocessed material.

8. The apparatus, according to claim 1, wherein said apparatus further includes a housing means and means attached to said housing means for reducing a size of a processed material.

9. The apparatus, according to claim 8, wherein said size reduction means includes one of a predetermined plurality of second tool support blocks attached to a bottom portion of said housing means adjacent such ground level, each of said predetermined plurality of said second support blocks has a second cutting tool secured therein and aligned transversely to said longitudinal axis of said hollow cylinder, at least one deflector means rigidly attached to an inner surface of said housing means and extending said predetermined length thereof for reducing a speed of said processed material within said housing shroud causing increased contact between such processed material and said cutting tools secured to said hollow cylinder and a combination thereof.

10. An apparatus for cutting and clearing brush, trees and land debris disposed at least one of at and below ground level, said apparatus comprising:

(a) a housing means including a housing shroud having a predetermined length and a pair of first end members rigidly attached to said housing shroud at each end thereof, whereby said housing means is open in a first direction generally aligned with a working direction of said apparatus and in a second direction aligned toward such ground level;

(b) a drive means attached to each of said first end members;

(c) a rotor assembly having a hollow cylinder with inner and outer surfaces, a pair of second end members rigidly attached to said inner surface and at least partially closing each end of said hollow cylinder, a rotational means rigidly attached to each second end member and aligned with a longitudinal axis of said hollow cylinder, said rotational means coupled to said drive means for enabling rotation of said rotor assembly, a predetermined plurality of tool support blocks each rigidly attached in a predetermined pattern to an outer surface of said hollow cylinder, each of said predetermined plurality of said support blocks has a tool attachment means with a longitudinal axis aligned in a predetermined direction about said longitudinal axis of said hollow cylinder, and a predetermined plurality of cutting tools each having a working end and a mounting shank, said mounting shank is secured in said tool attachment means of said support block and said working end outwardly extending from said outer surface of said hollow cylinder in said predetermined direction, said working end disposed at a first predetermined height above said outer surface of said hollow cylinder;

(d) means rigidly attached to said housing means for pivotally attaching said apparatus to a carrying vehicle;

(e) means rigidly attached to said housing means for holding a portion of material disposed above said rotor assembly and for pushing such material to contact a first portion of said predetermined plurality of said cutting tools generally aligned in said working direction;

(f) means rigidly attached to an inner surface of said housing shroud adjacent said ground level for guiding such material to contact a second portion of said predetermined plurality of said cutting tools generally aligned in a direction of said inner surface of said housing shroud and for controlling a length of an unprocessed material;

(g) a predetermined plurality of second tool support blocks rigidly attached to said inner surface of said housing shroud adjacent such ground level and forming a first row and a second row of said second support blocks aligned with a bottom edge of said housing shroud;

(h) a plurality of second cutting tools each secured within each of said second tool support blocks, each of said second cutting tools has a second working end disposed transversely to said longitudinal axis of said rotor assembly; and (i) means rigidly attached to an inner surface of said housing shroud and extending said predetermined length thereof for reducing a speed of processed material within said housing shroud causing increased contact between such processed material and said cutting tools secured to said rotor assembly.

11. The apparatus, according to claim 10, wherein said apparatus further includes means engageable with said housing means for selectively directing a discharge of processed material.

12. The apparatus, according to claim 11, wherein said directional discharge means includes a first member pivotally attached to a front portion of said housing means and at least partially extending said predetermined length thereof, said first member movable between a first position in general alignment with an upper surface of said housing shroud for discharging such processed material in a direction generally aligned toward such ground level and a second position wherein a front edge of said first member is lifted for discharging such processed material in a forward direction.

13. The apparatus, according to claim 12, wherein said apparatus further includes power means attached to said housing means for moving said first member between said first and said second positions, said power means is remotely operable.

14. The apparatus, according to claim 11, wherein said directional discharge means includes a second member removably attached to a bottom portion of said housing means.

15. The apparatus, according to claim 10, wherein said drive means includes an in-line gearbox directly coupled to a first portion of said rotational means at one end and to a prime mover at a distal end and a stationaryly disposed bearing means coupled to a second portion of said rotational means, whereby energization of said prime mover enables said gearbox to generate a rotating force and rotate said rotor assembly in said working direction.

16. The apparatus, according to claim 10, wherein said apparatus further includes means engageable with said outer surface of said hollow cylinder adjacent each of said plurality of said cutting tools for controlling penetration of said working end into such material, said means having at least a portion thereof disposed at a second predetermined height above said outer surface of said hollow cylinder which is smaller than said first predetermined height of said working end.

17. The apparatus, according to claim 10, wherein said apparatus further includes a pair of members removably attached to a bottom edge of each first end member of said housing means, each of said members has a predetermined thickness for controlling a cutting height of said working end of said cutting tools attached to said rotor assembly, whereby said working end is disposed below ground level when said members are detached.

18. An apparatus for cutting and clearing brush, trees and land debris associated disposed at least one of at and below ground level, said apparatus comprising:

(a) a housing means including a housing shroud having a predetermined length and a pair of first end members rigidly attached to said housing shroud at each end thereof, whereby said housing means is open in a first direction generally aligned with a working direction of said apparatus and in a second direction aligned toward such ground level;

(b) a drive means attached to each of said first end members;

(c) a rotor assembly having a hollow cylinder with inner and outer surfaces, a pair of second end members rigidly attached to said inner surface and at least partially closing each end of said hollow cylinder, a pivot means rigidly attached to each second end member and aligned with a longitudinal axis of said hollow cylinder, said pivot means coupled to said drive means for enabling rotation of said rotor assembly, a predetermined plurality of tool support blocks each rigidly attached in a predetermined pattern to an outer surface of said hollow cylinder, each of said predetermined plurality of said support blocks has a tool attachment means with a longitudinal axis aligned in a predetermined direction about said longitudinal axis of said hollow cylinder, and a predetermined plurality of cutting tools each having a working end and a mounting shank, said mounting shank is secured in said tool attachment means of said support block and said working end outwardly extending from said outer surface of said hollow cylinder in said predetermined direction, said working end disposed at a first predetermined height above said outer surface of said hollow cylinder;

(d) means rigidly attached to said housing means for pivotally attaching said apparatus to a carrying vehicle;

(e) means rigidly attached to said housing means for holding a portion of such material disposed above said rotor assembly for pushing such material to contact a first portion of said predetermined plurality of said cutting tools generally aligned in said working direction;

(f) means rigidly attached to an inner surface of said housing shroud adjacent such ground level for guiding such material to contact a second portion of said predetermined plurality of said cutting tools generally aligned toward said inner surface of said housing shroud and for controlling a length of an unprocessed material;

(g) means rigidly attached to an inner surface of said housing shroud and extending said predetermined length thereof for reducing a speed of such processed material within said housing shroud to increase contact between such processed material and said cutting tools secured to said rotor assembly; and means engageable with said housing means for selectively directing a discharge of such processed material.

19. In an apparatus for cutting and clearing brush, trees and land debris disposed at least one of at and below ground level, said apparatus having a predetermined plurality of cutting tools attached to a rotor that rotates about a horizontal axis, the improvement comprising:

(a) a housing means including a housing shroud having a predetermined length and a pair of first end members rigidly attached to said housing shroud at each end thereof, whereby said housing means is open in a first direction generally aligned with a working direction of said apparatus and in a second direction aligned toward such ground level;

(b) a predetermined plurality of tool support blocks rigidly attached to said inner surface of said housing shroud adjacent such ground level and forming a first row and a second row of said second support blocks aligned with a bottom edge of said housing shroud;
(c) a plurality of second cutting tools each secured within each of said second tool support blocks, each having a second working end disposed transversely to a longitudinal axis of such rotor; and
(d) means rigidly attached to an inner surface of said housing shroud adjacent such ground level for guiding such material to contact a portion of such predetermined plurality of such cutting tools attached to such rotor and generally aligned toward said inner surface of said housing shroud and to contact said plurality of said second cutting tools attached to said housing shroud, said means for controlling a length of an unprocessed material.

* * * * *